Nov. 25, 1969  R. HAYDEN  3,480,944
LAMP FLASHING SYSTEM FOR VEHICLES
Filed June 10, 1966
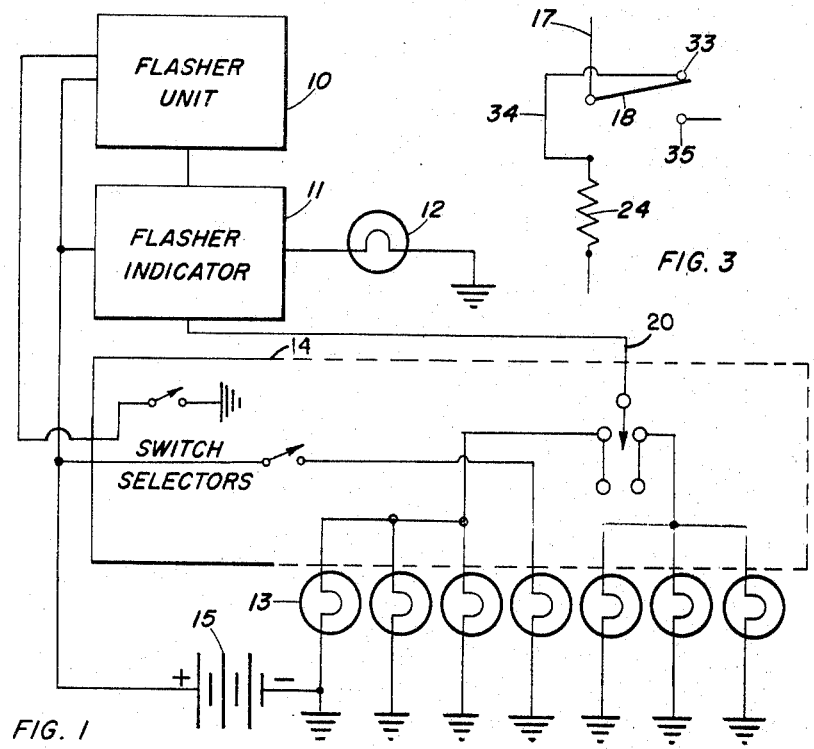
FIG. 3
FIG. 1
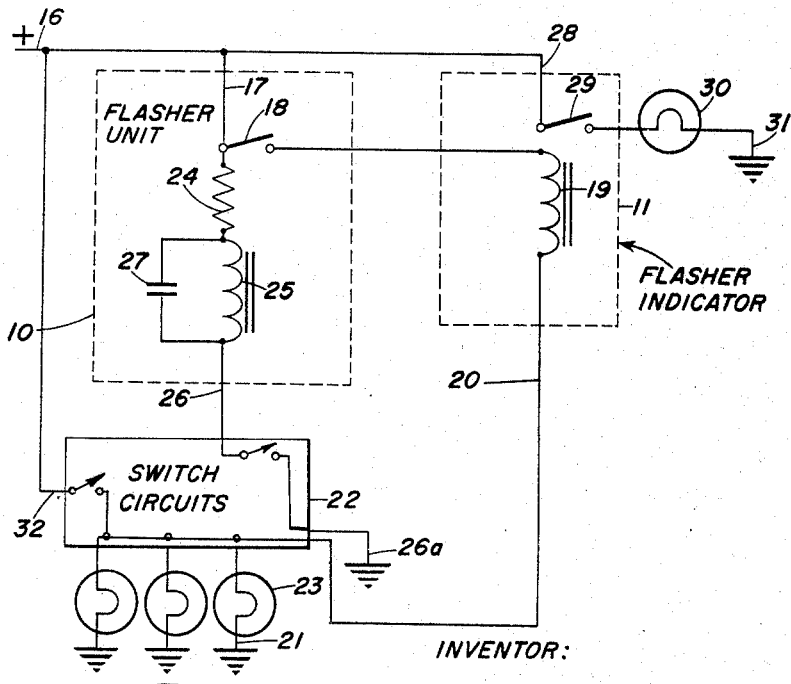
FIG. 2
INVENTOR:
RODNEY HAYDEN
BY: Philip E. Parker
ATT'Y.

3,480,944
LAMP FLASHING SYSTEM FOR VEHICLES
Rodney Hayden, Stoney Creek, Ontario, Canada, assignor, by mesne assignments, to United-Carr Incorporated, Boston, Mass., a corporation of Delaware
Filed June 10, 1966, Ser. No. 556,750
Claims priority, application Canada, Apr. 19, 1966, 958,288
Int. Cl. G08b 5/00; H05b 39/00; B60q 1/46
U.S. Cl. 340—331                                    2 Claims

ABSTRACT OF THE DISCLOSURE

This is a flasher system for use in an automobile or the like which utilizes a high resistance circuit having a resistor in series with a coil which in turn is shunted by a capacitor and a low resistance circuit which utilizes a second coil which is activated by closing of the relay of the first coil. The second coil actuates a relay which in turn causes a warning light to flash but will not cause the light to flash if one of the main bulbs is not working.

This invention relates to improvements in lamp flashing systems for vehicles such as for instance for automobiles.

---

Conventionally various circuits are provided in automobile lamp flashing systems which incorporate one or more flashing units these normally being of the bi-metallic heat operable type. In any such devices the cost of providing the flasher constitutes the main portion of the total cost of the system, this being due chiefly to the cost of providing a reliable flasher, operable under varying temperature conditions and having an acceptable life.

One of the problems long associated with the provision of flasher systems has been the difficulty of providing a low cost flasher unit which did not operate on heat principles and yet was sufficiently reliable over extended periods of use. Various attempts have heretofore been tried, utilizing many different types of mechanical flashers with the hope of providing a low cost reliable flasher unit. While some of these mechanical flashers have actually been manufactured and used, resort is usually had to the thermal type of flasher unit which as has been stated, is often too costly.

However, the present invention provides a flashing system which utilizes low cost parts and provides a system of high reliability. The invention accomplishes this as a main object by providing a low resistance circuit connected through switch means to the power supply of the vehicle and one or more of the lamps therein, a high resistance circuit also connected to the power supply and switch means and in parallel with the low resistance circuit, the high resistance circuit including a relay coil together with a fixed resistance, the relay coil being operable upon a current flow to close suitable relay contacts and short out the high resistance circuit by means of the low resistance circuit, and a capacitor across the relay coil whereby during initial operation the capacitor is charged and whereafter the contacts are closed by the relay coil, the shorted out capacitor thus discharging back through the relay coil to maintain the contacts closed for a predetermined time.

Further details of the invention will be apparent from the following detailed description and accompanying drawing in which like numerals refer to like parts throughout the various views. In the drawings:

FIGURE 1 is a block diagram of a flashing system according to the present invention;

FIGURE 2 is a wiring diagram of a flasher unit with indicator as connected to the vehicle lighting system; and FIGURE 3 is a scrap view of a further embodiment.

With reference to FIGURE 1 a system according to the present invention is illustrated and comprises the flasher unit 10, a flasher indicator 11 controlled by said flasher unit 10 to operate the flasher indicating lamp 12, the flasher unit 10 also selectively operating the lamps as at 13 depending upon the selected position for the switch selectors 14. Power is supplied by means of the battery 15. In a vehicle system the selector switches 14 and the lamps 13 would be as normally supplied and it is intended that the switch selector block 14 represent all such ordinary supplied switches and selectors as used on a vehicle system, the lamps 13 also representing all of the lamps as would normally be used and supplied.

The wiring diagram for the flasher unit together with the flasher indicator is shown in FIGURE 2 and it will be seen that three different circuits are provided in the unit. From the electrical power supply 16 the first circuit which is a low resistance circuit is provided by means of the wire 17, relay contacts 18 flasher coil 19 and the wire 20 to finish at the ground 21 through switch circuits 22 and passing through at least one lamp as at 23. A second circuit, which is a high resistance circuit, is provided by means of the wire 17, the fixed resistance 24, the relay coil 25, and the wire 26 which is connected to ground 26A. In addition to these two circuits a further or third circuit is provided by the capacitor 27 connected across the relay coil 25 to be in parallel therewith. A still further circuit is provided by the wire 28 passing through the flasher contacts 29, the flasher lamp 30 to ground 31. In addition a bypass circuit formed by the wire 32 is provided from the supply 16 to the switch circuits 22 for normal uninterrupted operation of the lamps 23. Initially, to start the flashing system, one of the switch circuits 22 is activated by one of the switch selectors and the current flows from the supply 16 through fixed resistance 24 and onto both legs of the two circuits which are the relay coil 25 and the capacitor 27 to ground out through the ground 26A. Due to the high current drain by the capacitor 27 a voltage drop occurs across the resistor 24 and the relay is not activated. Upon the capacitor 27 approaching the charged condition, sufficient current is available whereby the voltage increases across the relay coil 25 and the contacts 18 close. This shorts out the high resistance circuit and causes the selected lamp 23 to become incandescent. At this time also the capacitor 27 being charged discharges through the relay coil 25 for a hold in time of the relay characteristic of the elements selected for the circuits. There is thus a delay in pull in of the relay while the capacitor 27 is being charged and a similar time interval while the capacitor 27 is discharging.

The flasher indicator 11 has a flasher coil 19 which is current sensitive and which will hold the contacts 29 in only while sufficient current flows through the coil 19. Thus should one of the lamps 23 be inoperative, insufficient current would be available in the circuit formed by the wire 20 and the contacts 29 would be opened. Thus should the lamp 30 not flash together with the flasher unit, this will be a signal that one or more of the lamps in the circuit is inoperative. The flasher coil 19 can of course be sized for a particular installation depending upon the size and number of the lamps 23. If contacts 29 are normally closed the operation is opposite.

For use in a conventional twelve volt automobile system the following sizes of elements are considered suitable. The fixed resistance can be rated at 200 ohms and the capacitor 27 can be rated at 2500 mfd. nonpolarized. The relay coil 25 is wound on a soft iron core one-quarter inch diameter having 4000 turns of No. 35 wire to give a total resistance of 200 ohms. The flasher coil 19 comprises 20 turns of No. 16 gauge wire to provide a total rating of 20 amperes flow minimum.

The following formulas apply for calculation of the delay and hold time for the relay coil circuit.

Formula for delay in pull in of relay $$T = 2.303 R_1 \times C \times \log_{10} \frac{ES}{EP}$$

Formula for hold in time of relay $$T = 2.303 R_2 \times C \times \log_{10} \frac{EP}{ED}$$

where:

T—time in seconds
$R_1$—resistance in megohms of resistor
C—capacitance in microfarads
ES—supply voltage
EP—pull in voltage of relay
$R_2$—relay resistance in megohms
ED—relay drop out voltage.

Because the ratio of EP to ES is approximately 3 and the common log of 3 is approximately 0.78, the calculation is simplified by assuming $T=RC$.

Referring to FIGURE 3 a further embodiment of the invention is shown wherein the relay contacts 18 are provided with additional normally closed contact 33 whereby in the initial stage of a cycle the wire 34 supplies current over to the fixed resistance 24. Upon pull in of the relay contacts 18 by means of the coil 25 as shown in FIGURE 2, a current from line 17 is fed into the low resistance circuit to contact 35 and the high resistance circuit is disconnected from the power supply at the end containing the fixed resistance 24 whereby the discharge of the capacitor 27 is entirely through the coil 25 and the current flow from the power supply is available for the lamps in circuit with the low resistance circuit.

What I claim is:

1. A flashing system having a predetermined flashing cycle and operating from a D.C. electrical power supply and comprising: a low resistance circuit connected to the power supply and comprising one set only of normally open relay contacts and one or more lamps in parallel therewith; a high resistance circuit connected to the power supply in parallel with said low resistance circuit and comprising a fixed resistance and a relay coil permanently in series, said fixed resistance being in circuit between said relay coil and said relay contacts, said coil being operable to close said relay contacts upon current flow therethrough; a capacitor connected in parallel relation to said relay coil; and switch means controlling said power supply through both said circuits, whereby upon current flowing initially through said switch means and in said high resistance circuit, said capacitor will cause a voltage drop at said relay coil and prevent pulling in of said contacts, and upon said capacitor approaching the charged condition operating voltage for said relay coil will be available to cause closing of said contacts to short out said high resistance circuit and illuminate said lamp, said capacitor then discharging through said relay coil to maintain the contacts closed until said capacitor approaches the discharged condition to then cause opening of said contacts to extinguish said lamp and to thus complete a flashing cycle, the build up of voltage in said capacitor determining the time of the off portion of the flashing cycle and the discharge of said capacitor determining the time of the on portion of the flashing cycle.

2. A flashing system as claimed in claim 1 including a current sensitive relay in series with said low resistance circuit operable to flash an indicator lamp upon the flow of a predetermined minimum current flow through said low resistance circuit, thus to indicate the continuity of the lamp load.

References Cited

UNITED STATES PATENTS

| | | |
|---|---|---|
| 2,129,747 | 9/1938 | Sorensen. |
| 2,797,409 | 6/1957 | Van Eyk _____ 340—331 X |
| 2,941,186 | 6/1960 | Gelli _____ 340—251 X |
| 2,984,820 | 5/1961 | Kennell. |
| 3,002,127 | 9/1961 | Grontkowski _____ 340—331 X |
| 3,247,402 | 4/1966 | Hayden _____ 340—331 X |

THOMAS B. HABECKER, Primary Examiner

CHARLES M. MARMELSTEIN, Assistant Examiner

U.S. Cl. X.R.

340—81